(12) United States Patent
Pelaez

(10) Patent No.: US 12,715,404 B1
(45) Date of Patent: Aug. 25, 2026

(54) BRAKE TRACTION CONTROL SYSTEM AND VEHICLE INCLUDING SAME

(71) Applicant: Honda Motor Co., Ltd., Tokyo (JP)

(72) Inventor: Joaquin A. Pelaez, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/174,075

(22) Filed: Apr. 9, 2025

(51) Int. Cl.
*B60T 8/17* (2006.01)
*B60T 8/171* (2006.01)
*B60T 8/175* (2006.01)

(52) U.S. Cl.
CPC .............. *B60T 8/175* (2013.01); *B60T 8/171* (2013.01); *B60T 2240/06* (2013.01)

(58) Field of Classification Search
CPC .......... B60T 8/171; B60T 8/175; B60W 1/04; B60W 1/18; B60W 1/20; B60W 1/22; B60W 30/02; B60W 40/064; B60W 50/14; B60W 2040/1307; B60W 2050/0025; B60W 2050/004; B60W 2520/10; B60W 2520/105; B60W 2520/125; B60W 2520/14; B60W 2710/18; B60W 2710/202; B60W 2710/22
USPC ...................................................... 701/70–81
See application file for complete search history.

(56) References Cited

U.S. PATENT DOCUMENTS 5,662,393 A * 9/1997 Kamiya .................. B60T 8/448 303/194
5,765,858 A * 6/1998 Kawagoe ................. F16F 9/38 280/124.179
6,519,517 B1 * 2/2003 Heyring ................. B60G 21/10 280/124.159
7,233,850 B2 6/2007 Nakano et al.
7,571,044 B2 8/2009 Brown et al.
7,925,412 B2 4/2011 Romanchok et al.
8,019,530 B2 9/2011 Kitano
11,904,841 B2 2/2024 Vandersmissen et al.
2001/0009206 A1 7/2001 Lines
(Continued)

FOREIGN PATENT DOCUMENTS

CN 2138596 Y 7/1993
CN 1204380 C 6/2005
(Continued)

*Primary Examiner* — Logan M Kraft
*Assistant Examiner* — Johnny H Hoang
(74) *Attorney, Agent, or Firm* — KENEALY VAIDYA LLP

(57) ABSTRACT

A brake traction control system for a vehicle can include a brake modulator in communication with each of the vehicle's brakes and configured to selectively actuate each of the brakes. A controller can be in electrical communication with the brake modulator and configured to determine a cross-axle loading condition is present if suspension stroke data for a first wheel indicates an unloaded state where the first wheel is spaced away from a travel surface, suspension stroke data for a second wheel and a third wheel indicate a loaded state where the second wheel and the third wheel are in contact with a travel surface, and the second wheel is diagonally opposed to the third wheel, and cause the modulator to actuate the brake connected to the first wheel and the brake connected to the fourth wheel if the controller determines the cross-axle loading condition.

20 Claims, 4 Drawing Sheets

(56) References Cited

U.S. PATENT DOCUMENTS

2001/0028155 A1* 10/2001 Way, II .................. A63C 17/28
280/8
2008/0284118 A1* 11/2008 Venton-Walters ...........................
B62D 49/0678
280/6.154
2017/0137023 A1* 5/2017 Anderson .......... B60G 17/0195
2021/0276643 A1* 9/2021 Ellifson ................ B60B 35/007
2023/0166567 A1* 6/2023 Wang ................. B60G 17/0195
701/37
2023/0271594 A1* 8/2023 Chen ......................... B60T 7/12
701/70

FOREIGN PATENT DOCUMENTS

CN 114604234 A 6/2022
CN 111709158 B 4/2023
WO 2017186323 A1 11/2017

* cited by examiner

BRAKE TRACTION CONTROL SYSTEM AND VEHICLE INCLUDING SAME

BACKGROUND

The disclosed subject matter relates to a brake traction control system for a vehicle. More particularly, the disclosed subject matter relates to methods and apparatus that determine a cross-axle loading condition and activate the brake traction control system to brake the unloaded wheels.

A vehicle can be configured to travel along an improved path (such as paths paved with a durable surface material, e.g., asphalt, concrete, stone, brick, etc.), an unimproved path (such as a dirt path), and/or any unmarked path of travel (such as along a wooded area, open field, rocky area, water feature, etc.). The vehicle can be specially configured to enhance performance while traveling along an unimproved or unmarked path of travel. This specialized configuration can include increased suspension travel, increased ground clearance, and/or enhanced durability, as compared to vehicles configured for travel along an improved path.

While traversing an unimproved or unmarked path, a vehicle can encounter a travel surface in which the coefficient of friction (u) on one side of the vehicle is different than the coefficient of friction on the other side of the vehicle. This surface can be referred to as a split μ surface. The vehicle can include a mechanical locking differential or a traction control system to decrease wheel spin and/or transfer torque to the wheel with the most traction while traveling along a split μ surface.

SUMMARY

Some embodiments are directed to a brake traction control system for a vehicle that includes a first wheel, a second wheel, a third wheel, a fourth wheel, and a power source configured to output a drive torque to at least a pair of the wheels. The brake traction control system can include a plurality of brakes, each of the brakes configured to be connected to a respective one of the wheels. A brake modulator can be in fluid communication with each of the brakes and configured to selectively distribute fluid pressure to each of the brakes and selectively release fluid pressure at each of the brakes. While a modulator in fluid communication with the brakes is contemplated for use in the presently disclosed subject matter, a system in which there is no fluid communication is contemplated, where an electronically direct-acting actuator for the brake caliper, such as what is used for Electronic Parking Brake systems can be used and controlled in accordance with the presently disclosed subject matter. For example, a controller can be in electrical communication with the brake modulator and configured to determine a cross-axle loading condition is present if suspension stroke data for the first wheel indicates an unloaded state where the first wheel is spaced away from a travel surface, suspension stroke data for the second wheel and the third wheel indicate a loaded state where the second wheel and the third wheel are in contact with a travel surface, and the second wheel is diagonally opposed to the third wheel, and cause the modulator to distribute fluid pressure to the brake connected to the first wheel and the brake connected to the fourth wheel if the controller determines the cross-axle loading condition.

Another of the embodiments can be directed to a vehicle that includes a first wheel, a second wheel, a third wheel, and a fourth wheel. A power source can be connected to at least one of the wheels and configured to output a driving torque to the at least one of the wheels. A plurality of brakes can be connected to a respective one of the wheels. A brake modulator can be in fluid communication with each of the brakes and configured to selectively distribute fluid pressure to each of the brakes and selectively release fluid pressure at each of the brakes. A controller can be in electrical communication with the brake modulator and configured to determine a cross-axle loading condition is present if suspension stroke data for the first wheel indicates an unloaded state where the first wheel is spaced away from a travel surface, suspension stroke data for the second wheel and the third wheel indicate a loaded state where the second wheel and the third wheel are in contact with a travel surface, and the second wheel is diagonally opposed to the third wheel. The controller can also be configured to cause the modulator to distribute fluid pressure to the brake connected to the first wheel and the brake connected to the fourth wheel if the controller determines the cross-axle loading condition.

Yet another embodiment can include a brake traction control system for a vehicle that has a first wheel, a second wheel, a third wheel, a fourth wheel, a power source configured to output a drive torque to at least a pair of the wheels, and an accelerator pedal in communication with the power source. The brake traction control system can include a plurality of brakes, each of the brakes configured to be connected to a respective one of the wheels. A brake modulator can be in fluid communication with each of the brakes and configured to selectively distribute fluid pressure to each of the brakes and selectively release fluid pressure at each of the brakes. A controller can be in electrical communication with the brake modulator and configured to receive pedal position data that includes one of a plurality of positions of the accelerator pedal, the plurality of positions includes an idle position, a maximum position, and an intermediate position that is located between the idle position and the maximum position, the power source operates at an idle speed if the pedal position data indicates the idle position, the power source operates at a maximum speed if the pedal position data indicates the maximum position, and the power source operates at an intermediate speed that is less than the maximum speed and greater than the idle speed if the pedal position data indicates the intermediate position, and determine a cross-axle loading condition is present if suspension stroke data for the first wheel indicates an unloaded state where the first wheel is spaced away from a travel surface, suspension stroke data for the second wheel and the third wheel indicate a loaded state where the second wheel and the third wheel are in contact with a travel surface, and the second wheel is diagonally opposed to the third wheel, and cause the modulator to distribute fluid pressure to the brake connected to the first wheel and the brake connected to the fourth wheel if the controller determines the cross-axle loading condition and the pedal position data indicates the idle position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

One type of vehicle traction control system can use the vehicle's braking system and the differential gear assembly to transfer drive torque away from a slipping wheel and to the wheel with traction. This type of traction control system can be referred to as a brake traction control system (BTCS) and can use components of the vehicle's anti-lock brake system (ABS) to implement its operation. For example, the BTCS can share the brake modulator, wheel speed sensors and the wheel brakes with the ABS.

The BTCS can include a controller that compares data from the wheel speed sensors to detect one or more slipping drive wheel(s) when the wheel speed data is greater for one of the drive wheels as compared to the wheel speed data for the other of the drive wheels. If the controller determines that the wheel speeds are different from each other, or the wheel speed(s) does/do not correlate to the vehicle speed, the controller can be configured to cause the brake modulator to distribute fluid pressure to the slipping wheel(s) so that rotation is slowed or stopped. In the case of a single slipping drive wheel, the brake torque applied to the slipping wheel can cause the differential gear assembly to transfer some or all of the drive torque from the slipping wheel to the wheel with traction. That is, the BTCS is a reactive system that operates after the driver of the vehicle has input a drive request via the accelerator pedal and at least one of the drive wheels is slipping.

Figure 1:
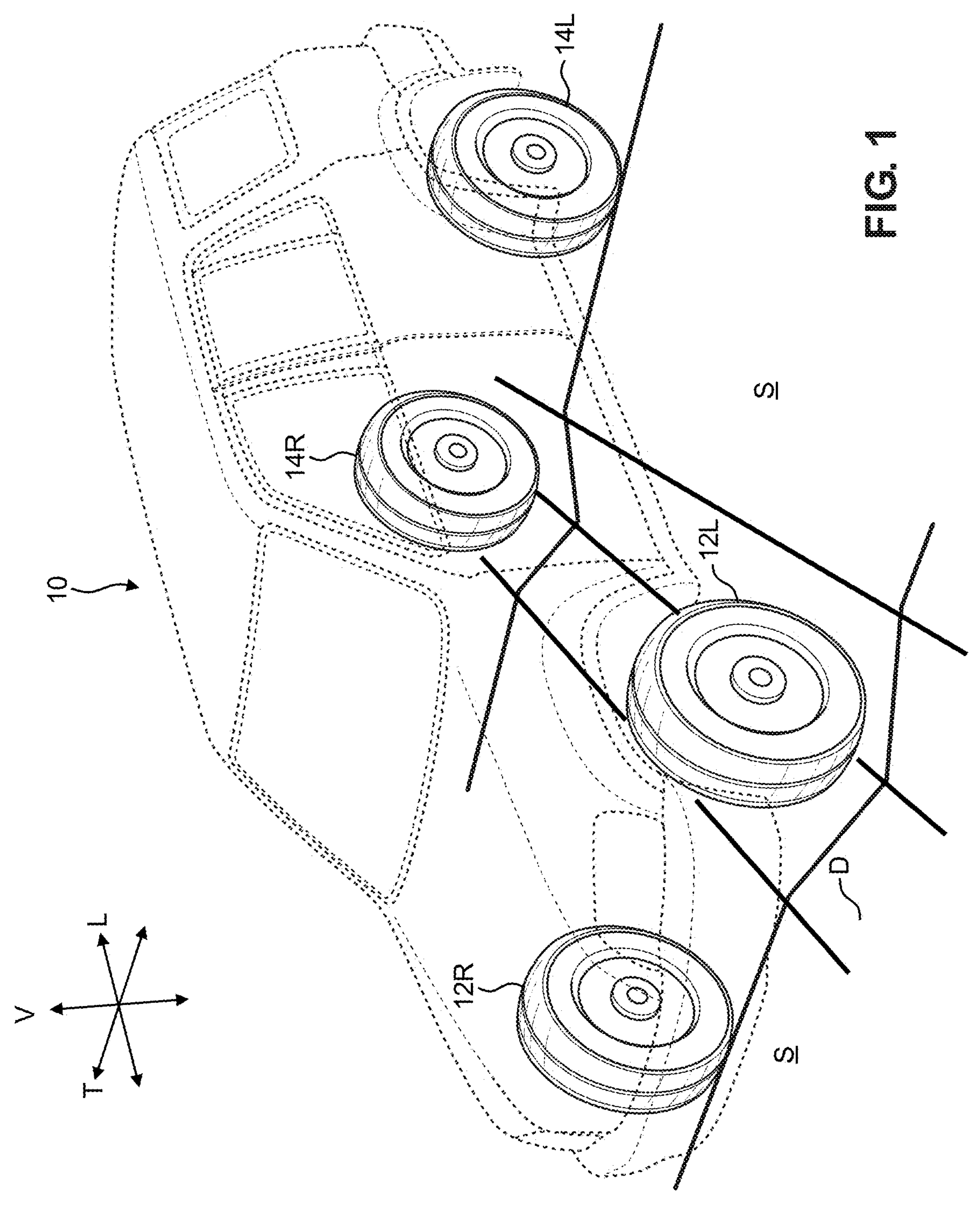
FIG. 1 is a perspective view of a vehicle including a brake traction control system made in accordance with principles of the disclosed subject matter.

FIG. 1 shows a vehicle 10 made in accordance with principles of the disclosed subject matter. The vehicle 10 can extend in the longitudinal direction L, the transverse direction T and a vertical direction V and can include a pair of front wheels 12L, 12R and a pair of rear wheels 14L, 14R. The left front wheel 12L and the right rear wheel 14R can diagonally oppose each other and can be referred to as opposite corner wheels. The right front wheel 12R and the left rear wheel 14L can diagonally oppose each other and can be referred to as opposite corner wheels.

The vehicle 10 can be configured as an all-wheel drive vehicle in which all four wheels 12L, 12R, 14L, 14R are always driven, an on-demand all-wheel drive vehicle in which the front wheels 12L, 12R are always driven and the rear wheels 14L, 14R are selectively driven and selectively idle, an on-demand all-wheel drive vehicle in which the rear wheels 14L, 14R are always driven and the front wheels 12L, 12R are selectively driven and selectively idle, or as a four-wheel drive vehicle in which the driver can select a two-wheel drive mode or a four-wheel drive mode.

Each of the wheels 12L, 12R, 14L, 14R can be connected to the vehicle 10 by a respective suspension assembly. The suspension assemblies are omitted from FIGS. 1 and 2 for clarity and simplicity of the drawings. Each suspension assembly can allow a respective one of the wheels 12L, 12R, 14L, 14R to move relative to the rest of the vehicle 10 through a suspension stroke that ranges from a compressed position to a droop position that is spaced away from the compressed position along the vertical direction V of the vehicle 10. That is, the suspension stroke includes a plurality of wheel positions that include a compressed position, a droop position, a static position between the compressed position and the droop position, at least one position between the static position and the compressed position, and at least one position between the static position and the droop position.

The static position is a position of the respective one of the wheels 12L, 12R, 14L, 14R when the vehicle 10 is parked on a flat, horizontal surface and emptied of cargo and passengers. The compressed position can be closer to the top of the vehicle 10 than the static position with respect to the vertical direction V of the vehicle. Each of the wheels 12L, 12R, 14L, 14R can contact the travel surface S if the respective one of the wheels 12L, 12R, 14L, 14R is in the static position, the compressed position or any position that is between the static position and the compressed position. Generally, any of the wheels 12L, 12R, 14L, 14R in the static position and the compressed position can have traction with the travel surface S.

The droop position can be further from the top of the vehicle 10 than the static position with respect to the vertical direction V of the vehicle 10. Any wheel in the droop position can be spaced above the travel surface S in the vertical direction V of the vehicle 10, or slightly contacting the travel surface S as compared to at least one of the other wheels in any position that is between the static and compressed positions, inclusive. Generally, a wheel that is in the droop position can be unloaded and can lack traction with the travel surface S or can have diminished traction with travel surface S as compared to any of the wheels 12L, 12R, 14L, 14R that are in any position that is between the static and compressed positions, inclusive.

Each of the wheels 12L, 12R, 14L, 14R can move toward the compressed position if a static load is placed on the vehicle 10 such as, but not limited to passengers and/or cargo. Any of the wheels 12L, 12R, 14L, 14R can move toward the compressed position if the wheel(s) 12L, 12R, 14L, 14R traverse a bump in in the travel surface. An outside one of the front wheels 12L, 12R and an outside one of the rear wheels 14L, 14R can move toward the compressed position if the vehicle 10 follows a curved path along the travel surface S, and an inside one of front wheels 12L, 12R and an inside one of the rear wheels 14L, 14R can move toward the droop position if the vehicle 10 follows the curved path along the travel surface S.

Each of the wheels 12L, 12R, 14L, 14R can be in a loaded state (or loaded) or in an unloaded state (or unloaded). In the loaded state, each of the wheels 12L, 12R, 14L, 14R can support a respective portion of the gross weight of the vehicle 10. The load supported by each of the wheels 12L, 12R, 14L, 14R can be the same as each other or different from each other. Generally, each of the wheels 12L, 12R, 14L, 14R can transfer drive torque to the travel surface S and propel the vehicle 10 in the desired direction when the respective one of the wheels 12L, 12R, 14L, 14R is in the loaded state. Generally, each of the wheels 12L, 12R, 14L, 14R is in the static position, or the compressed position, or a position between the static position and the compressed position when the respective one of the wheels 12L, 12R, 14L, 14R is in the loaded state.

A wheel in the unloaded state can be in the droop position or at a position of between the static position and the droop position in the vertical direction V of the vehicle 10. Generally, each of the wheels 12L, 12R, 14L, 14R can lack traction, or have severely diminished traction as compared to the loaded state, with the travel surface S.

During travel along an unimproved or unmarked path, a vehicle 10 can encounter a situation referred to as a cross-axle loading condition that is shown in FIG. 1. Here, the ground contour of the travel surface S can include a depression D that is relatively narrow such that the vehicle 10 can straddle the high ground on both sides of the depression D. It is possible that the vehicle 10 is driven along a trajectory that intersects the depression at an oblique angle. As shown in FIG. 1, the left front wheel 12L can overlap above the depression D with respect to the vertical direction V, the right front wheel 12R can be on the right side of the depression D, the left rear wheel 14L can be on the left side of the depression D and the right rear wheel 14R can overlap above the depression D with respect to the vertical direction V. As a result of this relative orientation, the right front wheel 12R and the left rear wheel 14L are in contact with the travel surface S and loaded by the weight of the vehicle 10, and at least one of the left front wheel 12L and the right rear wheel 14R are spaced away from the travel surface S and are unloaded.

If the vehicle 10 is perfectly balanced in the longitudinal direction L and the transverse direction T, it is possible that both the left front wheel 12L and the right rear wheel 14R are spaced above the depression D. If the vehicle 10 is unbalanced in either the longitudinal direction L or the transverse direction T, one of the left front wheel 12L and the right rear wheel 14R will contact the surface of the depression D and the other of the left front wheel 12L and the right rear wheel 14R will be spaced above the depression D. The one of the left front wheel 12L and the right rear wheel 14R that contacts the depression D can be loaded with a portion of the vehicle weight that is less than the loading applied to the loaded wheels 12R, 14L.

The loaded wheels 12R, 14L can provide traction with the travel surface S. The unloaded wheel(s) 12L and/or 14R can lack traction with the travel surface S or have less traction as compared to the loaded wheels 12R, 14L. That is, a first set of opposite corner wheels 12R, 14L (also referred to as first diagonal wheels) can provide traction and at least one wheel of a second set of opposite corner wheels 12L, 14R (also referred to as second diagonal wheels) can lack traction with the travel surface S or can have severely diminished traction as compared to the first diagonal wheels 12R, 14L.

The vehicle 10 can be specialized for off-road travel such that the vehicle 10 can traverse an obstacle and enter a cross-axle loading state while traversing an obstacle that is different from the depression D in the travel surface S. The obstacle can be any obstacle such as, but not limited to, rock(s), boulder(s), a shallow body of water, fallen tree branch(es), fallen tree(s), or any combination of these obstacles.

Figure 2:
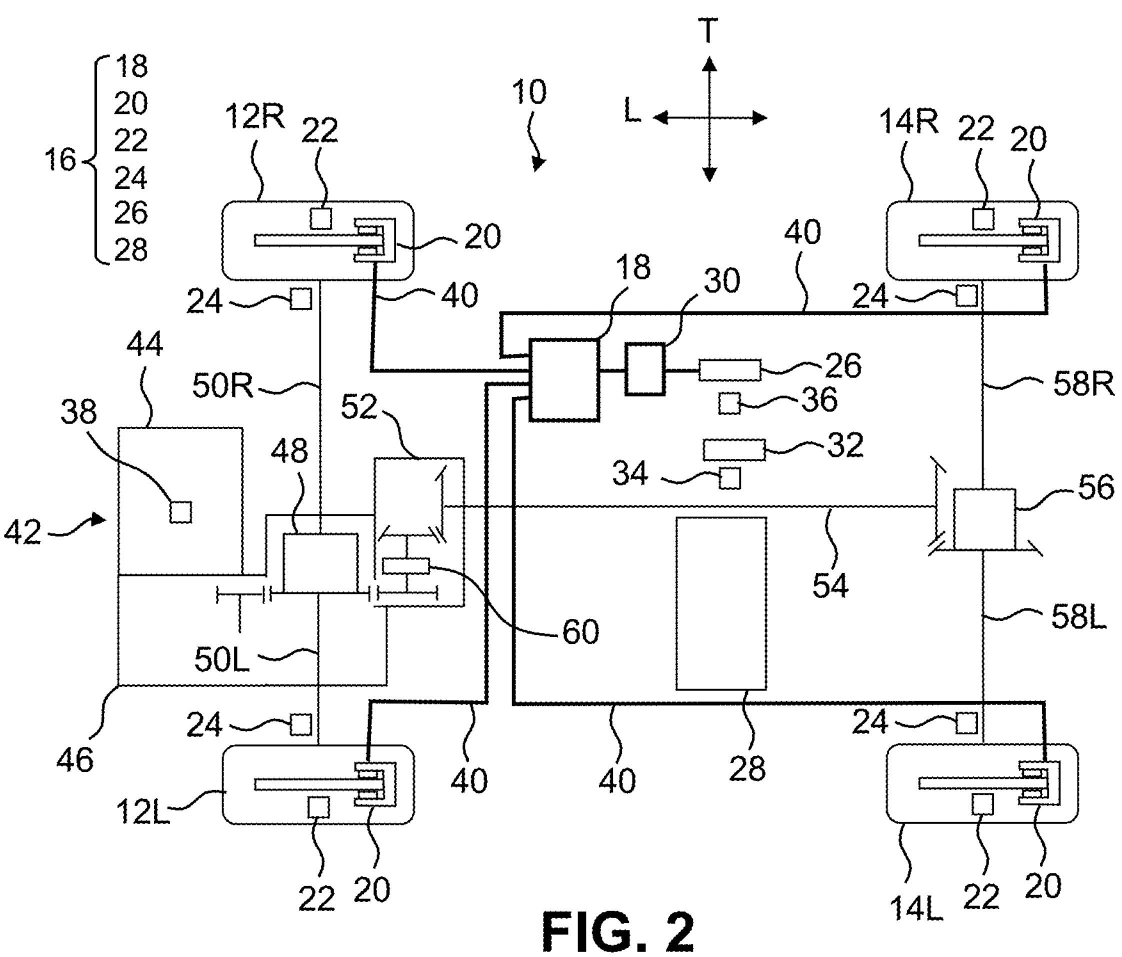
FIG. 2 is a schematic view of the vehicle of FIG. 1.

Referring to FIG. 2, the vehicle 10 can include a plurality of wheel speed sensors 22, each of which are configured to output data that is indicative of the rotational speed of a respective one of the wheels 12L, 12R, 14L, 14R. The BTCS can be configured to detect the loaded wheels and unloaded wheel(s) using data from the wheel speed sensors 22. For example, if wheel speed data from the wheel speed sensors indicate that the left front wheel 12L is spinning and the right front wheel 12R is not moving, then it is possible that the left front wheel 12L is unloaded and the right front wheel 12R is loaded.

However, the wheel speeds cannot be registered under a certain threshold speed due to certain limitations such as, but not limited to, the resolution of the wheel speed sensors 22. In the cross-axle loading condition, the wheel speeds can be too low to be detected due to sensor resolution. Typically, a driver will cause the wheel spin to increase in an effort to cause the vehicle 10 to move along the travel surface S. Thus, it is possible for a large lag to elapse between detection of the cross-axle loading state and each of proper brake modulation, torque application, and vehicle movement. The driver of the vehicle 10 can negatively perceive this relatively large lag. Thus, it can be desirable to enhance a BTCS to reduce lag when the vehicle 10 encounters a cross-axle loading condition at low wheel speeds and/or low vehicle speeds.

FIGS. 1 and 2 illustrate an embodiment of the vehicle 10 that includes a brake traction control system (BTCS) 16 (FIG. 2) that is made in accordance with principles of the disclosed subject matter. Referring to FIG. 2, the BTCS 16 can include a brake modulator 18, a plurality of brakes 20, the plurality of wheel speed sensors 22, a plurality of suspension stroke sensors (also referred to as wheel stroke sensors) 24, an accelerator pedal 26 and a controller 28. Although the controller 28 is shown schematically, it should be understood that the engine controller and Brake/Vehicle Stability Assist (VSA) controller and/or (BTCS) controller can be separate units or combined units, including separate or combined hardware and/or software.

The BTCS 16 can be configured to rely on the suspension stroke sensors 24 to detect the cross-axle loading condition and cause the brake modulator 18 to distribute fluid pressure to the brake(s) of the unloaded wheel(s) without a detection of actual wheel slip. Due to one or more limitations of the wheel speed sensors 22 discussed above and/or other limitations, it is possible for the suspension stroke sensors 24 to provide data indicative of a cross-axle loading condition before the wheel speed sensors 22 provide data indicative of wheel slip. Thus, the BTCS 16 can reduce the lag time between actual wheel slip and movement of the vehicle 10.

It is possible that the vehicle 10 is stationary when the vehicle 10 enters into the cross-axle loading condition. The controller 28 can be configured to pre-emptively brake the unloaded wheel(s) before the driver of the vehicle 10 has depressed the accelerator pedal 26 by using the data the controller 28 receives from the suspension stroke sensors 24. Thus, the BTCS 16 can be a proactive system instead of reactive system, at least with respect to improving drive traction during a cross-axle loading condition.

Accordingly, the BTCS 16 can improve the driver's perception of the responsiveness of the BTCS 16 and drivability of the vehicle 10.

Returning to FIG. 1, the vehicle 10 is depicted as a cross-over vehicle (also referred to as a sport-utility passenger vehicle or an SUV) that is primarily driven along an improved path but can be driven off-road along an unimproved path or an unmarked path. However, the disclosed vehicle 10 can be configured for travel along any one or combination of improved, unimproved, and unmarked paths. For example, embodiments are intended to include or otherwise cover any type of automobile, including a passenger car, minivan, truck, semi-tractor, off-highway vehicle, etc. In other alternate embodiments, the vehicle 10 can be specialized for use on an unimproved path or on an unmarked path, and can be referred to as a multipurpose utility vehicle (MUV), all-terrain vehicle (ATV), or as a side-by-side all-terrain vehicle (S×S, or S×S ATV).

Figure 3:
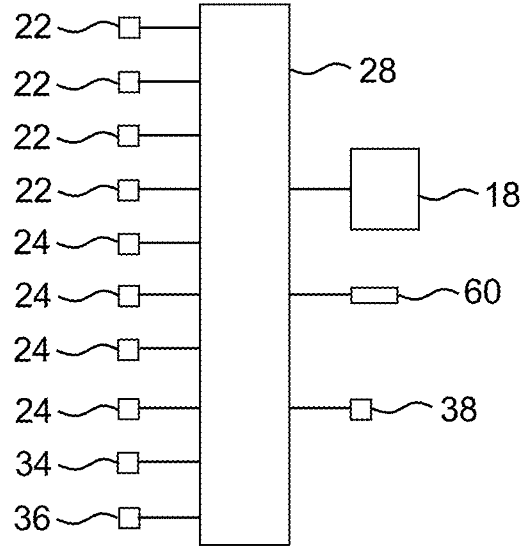
FIG. 3 is a schematic electrical diagram of the vehicle of FIG. 1.

Referring to FIG. 2, the vehicle 10 can include a brake master cylinder 30, a brake pedal 32, a brake pedal sensor 34, an accelerator pedal sensor 36, a power plant output control device 38, a plurality of brake lines 40 and a power source 42. Referring to FIG. 3, the controller 28 can be in electrical communication with the brake modulator 18, the wheel speed sensors 22, the suspension stroke sensors 24 and the brake and accelerator pedal sensors 34, 36. The power plant output control device 38 can be configured as the vehicle motor (internal combustion engine, battery powered electric motor, fuel cell powered electric motor) or can be an output from a torque control device such as a transmission or other structure that controls output of torque. The device of the disclosed subject matter is configured primarily to vary the torque output to the wheel(s), and secondarily vary the speed output of the wheels, via the power plant (engine or motor) through a transmission/power train structure.

Torque is a key control parameter (outside of an idle condition for the motor), and speed/engine speed is a secondary parameter.

The brake master cylinder 30 can be connected to the brake pedal 32 and in fluid communication with the brake modulator 18. The master cylinder 30 can be configured to convert displacement of the brake pedal 32 into a requested fluid pressure for each of the brakes 20.

The brake lines 40 can be in fluid communication with the brake modulator 18 and each of the brake lines 40 can be fluid communication with a respective one of the brakes 20. The brake lines 40 can be any appropriate conduit that can withstand the hydraulic pressure of the brake fluid and the environment in which in the vehicle 10 operates.

The brake modulator 18 can include at least one fluid circuit component that can permit the brake modulator 18 to selectively and independently vary the fluid pressure in each of the brake lines 40. The brake modulator 18 can include at least one regulator valve. The regulator valve can be in fluid communication with the brake lines 40. The regulator valve can define an open position and a closed position. If the regulator valve is in the open position, the fluid pressure in the brake lines 40 and at the brakes 20 can be released so that the pads can be disengaged from the rotating members. If the regulator valve is in the closed position, the fluid pressure in the brake lines 40 and at the brakes 20 can be maintained at the pressure set by the master cylinder 30 or by the brake modulator 18. The regulator valve can be positioned in any position between the closed position and the opened position in order to vary the rate at which fluid pressure can be released in the brake lines 40 and at the brakes 20.

Each wheel speed sensor 22 can be configured to output data indicative of a rotational speed (or velocity) of a respective one of the plurality of wheels 12L, 12R, 14L, 14R. The wheel speed sensors 22 can be mounted on an appropriate portion of the vehicle 10 to detect rotation of the respective one of the wheels 12L, 12R, 14L, 14R in any appropriate manner. The raw data from the wheel speed sensors 22 can be processed by the wheel speed sensors 22 or by the controller 28 to indicate a rotational speed (or velocity) of the respective one of the wheels 12L, 12R, 14L, 14R. The wheel speed sensors 22 can be any type of sensor capable of providing the appropriate data.

The suspension stroke sensors 24 can be configured to output data indicative of the position of the respective one of the wheels 12L, 12R, 14L, 14R within the range of the suspension stroke. The raw data from the suspension stroke sensors 24 can be processed by the suspension stroke sensors 24 or by the controller 28 to indicate a position of the respective one of the wheels 12L, 12R, 14L, 14R within the suspension stroke. The suspension stroke sensors 24 can be any appropriate sensor that can provide the desired position data and can be at any appropriate location of the vehicle 10 that can enable the sensors 24 to provide the desired position data.

The power source 42 can include an internal combustion engine, an electric motor or a hybrid of an internal combustion engine and an electric motor. The power source 42 configured as an internal combustion engine or a hybrid power source can have the engine output axis oriented in the longitudinal direction L or in the traverse direction T of the vehicle 10. The engine can be mounted forward of the front axles, rearward of the rear axles, or intermediate the front and rear axles. In the exemplary embodiment of FIG. 1, the power source 42 can include a transversely-oriented front-mounted internal combustion engine 44.

The power plant output control device 38 can be configured to vary the speed and/or torque output of the power source 42 based on the torque demand indicated by the position of the accelerator pedal 26. The accelerator pedal 26 and the power plant output control device 38 can be configured as a by-wire system. The power plant output control device 38 can include a butterfly valve located in an intake manifold of the power source 42 and an electromechanical actuator coupled to the butterfly valve.

The accelerator pedal sensor 36 can be configured to output data that is indicative of the position of the accelerator pedal 26. The controller 28 can be configured to receive the position data from the accelerator pedal sensor 36 and cause the actuator to move the butterfly valve to a position that corresponds to the position of the accelerator pedal 26. In certain instances, the butterfly may not move exactly to the position indicated by the accelerator pedal, for example in drive by wire applications due to processing/filtering/other limitations associated with the engine control unit. Basically, the pedal position can be converted to torque demand in various manners, for use with the presently disclosed subject matter.

The vehicle 10 can be configured as an on-demand all-wheel drive vehicle in which the front wheels 12L, 12R are normally driven and the rear wheels 14L, 14R are driven on-demand to increase tractive effort. The power source 42 can include a multi-ratio transmission 46 that is driven by the internal combustion engine 44.

The vehicle 10 can include a front differential gear assembly 48, a pair of front driveshafts 50L, 50R, a power-take-off assembly 52, a propeller shaft 54,a rear differential gear assembly 56 and a pair of rear driveshafts 58L, 58R.

The front differential gear assembly 48 can be connected to and driven by the transmission 46 in any appropriate manner. For example, the transmission 46 can include an output gear and the front differential gear assembly 48 can include an input gear that engages and is driven by the output gear of the transmission 46.

The front differential assembly 48 can include any appropriate geartrain that permits the front wheels 12L, 12R to rotate at the same speed or at different speeds relative to each other. The front differential gear assembly 48 can be configured as an open differential, a limited-slip differential, or a lockable differential. For example, the front differential gear assembly 48 can include a carrier that rotates with the input gear, at least one planetary gear mounted onto the carrier and rotates about an axis that is orthogonal to the rotational axis of the input gear and the carrier, and a pair of output gears that engage the at least one planetary gear and rotate about an axis that is coaxial with the rotational axis of the input gear and the carrier.

The front driveshafts 50L, 50R can be connected to the front differential gear assembly 48 in any appropriate manner that transfers drive torque output by the front differential gear assembly 48 to the front driveshafts 50L, 50R. The left front driveshaft 50L can be connected to and drive the left front wheel 12L in any appropriate manner that transfers drive torque output by the front differential gear assembly 48 to the left front wheel 12L. The right front driveshaft 50R can be connected to and drive the right front wheel 12R in any appropriate manner that transfers drive torque output by the front differential gear assembly 48 to the right front wheel 12R.

Each of the front driveshafts 50L, 50R can include a pair of universal joints, one at each end, that allow the driveshafts 50L, 50R to pivot relative to the rotational axis of the front differential gear assembly 48, allow the rotational axis of the driveshafts 50L, 50R to pivot relative to the rotational axis of the respective one of the front wheels 12L, 12R, and allow the rotational axis of each of the front wheels 12L, 12R to pivot about a steering axis.

The power-take-off assembly 52 can be connected to the front differential assembly 48 in any appropriate manner that transfers drive torque from the front differential assembly 48 to the power-take-off assembly 52. For example, the power-take-off assembly 52 can include an input gear that is driven by the input gear of the front differential assembly 48.

The propeller shaft 54 can be connected to the power-take-off assembly 52 in any appropriate manner that transfers drive torque from the power-take-off assembly 52 to the propeller shaft 54. For example, the power-take-off assembly 52 can include an output gear that is driven by the input gear of the power-take-off assembly 52 and the propeller shaft 54 can include an input gear that is driven by the output gear of the power-take-off assembly 52.

The rear differential gear assembly 56 can be connected to and driven by the propeller shaft 54 in any appropriate manner. For example, the propeller shaft can include an output gear and the rear differential gear assembly 56 can include an input gear that engages and is driven by the output gear of the propeller shaft 54.

The rear differential assembly 56 can include any appropriate geartrain that permits the rear wheels 14L, 14R to rotate at the same speed or at different speeds relative to each other. The rear differential assembly 56 can be configured in any appropriate manner described above with respect to the front differential assembly 48.

The rear driveshafts 58L, 58R can be connected to the rear differential gear assembly 56 in any appropriate manner that transfers drive torque output by the rear differential gear assembly 56 to rear driveshafts 58L, 58R. The left rear driveshaft shaft 58L can be connected to and drive the left rear wheel 14L in any appropriate manner that transfers drive torque output by the rear differential gear assembly 56 to the left rear wheel 14L. The right rear driveshaft shaft 50R can be connected to and drive the right rear wheel 14R in any appropriate manner that transfers drive torque output by the rear differential gear assembly 56 to the right rear wheel 14R.

Each of the rear driveshafts 58L, 58R can include a pair of universal joints, one at each end, that allow the rear driveshafts 58L, 58R to pivot relative to the rotational axis of the rear differential gear assembly 56 and allow the rotational axis of the rear driveshafts 58L, 58R to pivot relative to the rotational axis of the respective one of the rear wheels 14L, 14R.

In summary, the engine 44 can drive the transmission 46 and the transmission 46 can drive the front differential gear assembly 48. The front differential gear assembly 48 can drive one or both of the front wheels 12L, 12R via a respective one of the front driveshafts 50L, 50R. The front differential assembly 48 can drive the power-take-off assembly 52, which, in turn, can drive the propeller shaft 54. The propeller shaft 54 can drive the rear differential gear assembly 56, and the rear differential gear assembly 56 can drive one or both of the rear wheels 14L, 14R via a respective one of the rear driveshafts 58L, 58R.

While travelling at low speeds along an unimproved path or unmarked path, the vehicle 10 can be in a cross-axle loading state where at least one of the wheels 12L, 12R, 14L, 14R is in an unloaded state where the wheel is spaced away the travel surface S. The differential gear assembly (48 or 56) will transfer (or attempt to transfer) most or all of the drive torque to the wheel that is spaced above the travel surface S and the wheel in contact with the travel surface will receive the remainder or none of the drive torque, respectively. Thus, the vehicle 10 can stop moving along the travel surface S due to the cross-axle loading state. The controller 28 can be configured to execute a cross-axle loading BTCS algorithm to determine if the vehicle is in the cross-axle loading state.

Figure 4:
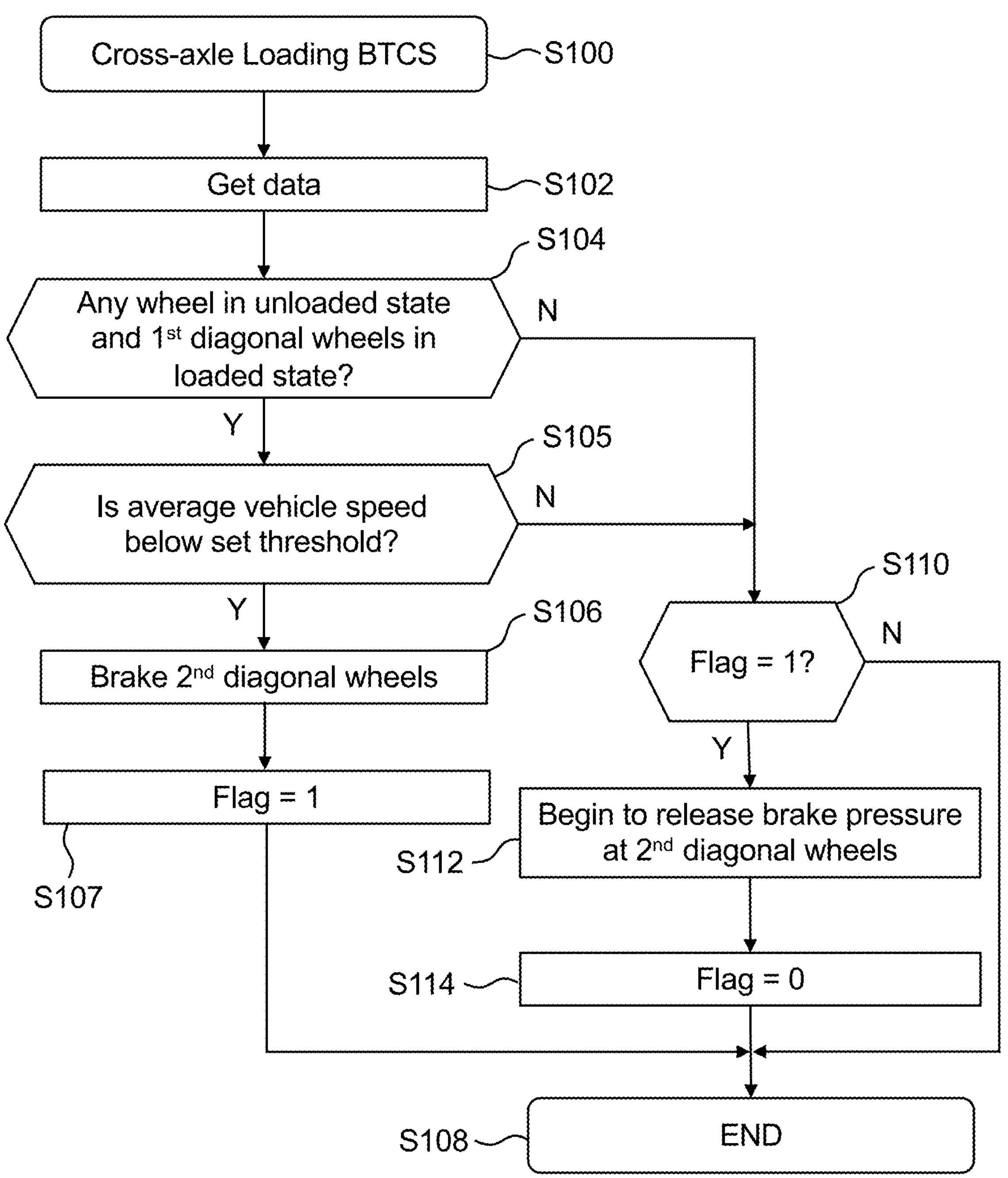
FIG. 4 is flowchart of an algorithm that can be executed by a controller of the brake traction control system of the vehicle of FIG. 1.

FIG. 4 illustrates a flowchart of cross-axle loading BTCS algorithm that can be executed by the controller 28. The controller 28 can be configured to begin the cross-axle loading BTCS algorithm at step S100. From step S100, the controller 28 can be configured to move to step S102.

At step S102, the controller 28 can be configured to receive data from the sensors 22, 24, 34, 36 or retrieve data from a storage device that has been generated by the sensors 22, 24, 34, 36 and saved in the storage device. From step S102, the controller 28 can be configured to move to step S104.

At step S104, the controller 28 can be configured to determine which of the wheels 12L, 12R, 14L, 14R, if any, are in an unloaded state (i.e., the droop position) and which of the wheels 12L, 12R, 14L, 14R, if any, are in a loaded state (i.e., the compressed position or between the static position and the compressed position).

If the controller 28 determines that at least one of the wheels 12L, 12R, 14L, 14R is in the unloaded state and at least two of the wheels 12L, 12R, 14L, 14R are in the loaded state, the controller 28 can be configured to determine whether the loaded wheels are a diagonal pair. For example, if the data from the suspension stroke sensor 24 coupled to the left front wheel 12L and/or the suspension stroke sensor 24 coupled to the right rear wheel 14R indicates an unloaded state and the data from the suspension stroke sensors 24 coupled to the right front wheel 12R and the left rear wheel 14L, respectively, indicate a loaded state, then the vehicle 10 can be in a cross-axle loading state. In this scenario, the right front wheel 12R and the left rear wheel 14L can be referred to as a first pair of diagonal wheels and the left front wheel 12L and the right wheel 14R can be referred to as a second pair of diagonal wheels.

Similarly, if the data from the suspension stroke sensor 24 coupled to the right front wheel 12R and/or the suspension stroke sensor 24 coupled to the left rear wheel 14L indicates an unloaded state and the data from the suspension stroke sensors 24 coupled to the left front wheel 12L and the right rear wheel 14L, respectively, indicate a loaded state, then the vehicle 10 can be in a cross-axle loading state. In this scenario, the left front wheel 12L and the right rear wheel 14R can be referred to as a pair of first diagonal wheels and the right front wheel 12R and the left wheel 14L can be referred to as a pair of second diagonal wheels.

At step S104, if the controller 28 determines that any one of the wheel(s) 12L, 12R, 14L, 14R is in the unloaded state and a pair of the wheels 12L, 12R, 14L, 14R are first diagonal wheels, then the controller 28 can be configured to move to step S105.

At step S105, the controller 28 can be configured to determine whether the average vehicle speed is below a set threshold, and if so, move to step 106.

At step S106, the controller 28 can be configured to cause the brake modulator 18 to apply braking pressure to the brakes 20 of the pair of the wheels 12L, 12R, 14L, 14R that are second diagonal wheels and not apply or release braking pressure to the first diagonal wheels. The pair of second diagonal wheels includes the unloaded wheel and its counterpart diagonal wheel.

The brake torque applied to the second diagonal wheels can be any appropriate value that overcomes the drive torque at the unloaded wheel(s). The brake torque can be a fixed predetermined value or a variable value that is a function of any combination of data from the accelerator pedal sensor 36, the rotational speed of the engine 44, and the active gear ratio in the transmission 46, and any other appropriate value or variable. Since at least one of the wheels of the second diagonal wheels is unloaded, the brake torque applied by the coupled brakes 20 will overcome the drive torque and stop rotation of the unloaded wheel(s). In response, the corresponding one of the differential gear assemblies 48, 56 will transfer the drive torque output by the transmission 46 to the pair of the wheels 12L, 12R, 14L, 14R that are the first diagonal wheels, which are not subject to the braking torque, and which have traction with the travel surface S, and can propel the vehicle 10 in the desired direction.

At step S107, the controller 28 can be configured to set a flag to a value of one (1), which indicates that the vehicle 10 is currently in the cross-axle loading state. The flag can be used determine whether the vehicle 10 is transitioning out of the cross-axle loading state. From step S107, the controller 28 can be configured to move to step S108.

At step S108, the controller 28 can be configured to end the present iteration of the cross-axle loading BTCS algorithm.

At steps S104 and S105, if the controller 28 determines that none of the wheel(s) 12L, 12R, 14L, 14R is in the unloaded state, or that the average vehicle speed is above a preset threshold, then the controller 28 can be configured to move to step S110. In this scenario, the vehicle 10 is not in a cross-axle loading state, and it can be advantageous to release the braking pressure, if any, from the second diagonal wheels and allow the driver of the vehicle 10 to operate the vehicle 10 via the accelerator pedal 26, the brake pedal 32 and/or other driver input(s), or operate the vehicle 10 in accordance with a different automated driver assist system (ADAS) such as, but not limited to, a different BTCS algorithm, ABS, vehicle stability control, hill descent control, or hill start control.

At step S110, the controller 28 can be configured to determine whether the cross-axle loading state was determined in the previous iteration of the cross-axle loading BTCS algorithm. If the flag has a value of one (1), then the vehicle 10 was in the cross-axle loading state during the previous iteration of the cross-axle loading BTCS algorithm and braking pressure is currently being applied to the second diagonal wheels. If the flag has a value of zero (0), then the vehicle 10 was not in the cross-axle loading state during the previous iteration of the cross-axle loading BTCS algorithm.

If the controller 28 determines that the present value of the flag is equal to one (1) then the controller 28 can be configured to move to step S112.

At step S112, the controller 28 can be configured to terminate operation of the brake modulator in accordance with the cross-axle loading BTCS algorithm. The controller 28 can be configured to cause the brake modulator to release the braking pressure from the brakes 20 coupled to the second diagonal wheels. From step S112, the controller 28 can be configured to move to step S114 to set the value of the flag to zero (0). From Step S114, the controller 28 can be configured to move to step S108 and terminate the cross-axle loading BTCS algorithm.

At step S110, if the present value of the flag equals zero (0), then the vehicle 10 was not in the cross-axle loading state during the previous iteration of the cross-axle loading BTCS algorithm. If the controller 28 determines that the value of the flag is zero (0), then the controller 28 can be configured to move to step S108 and terminate the cross-axle loading BTCS algorithm.

The cross-axle loading BTCS algorithm does not necessarily rely on wheel speed data from the wheel speed sensors 22. Thus, the cross-axle loading BTCS algorithm is not limited by the resolution or other limitations of the wheel speed sensors 22. This advantage can reduce the lag time between when the first wheel starts to slip and when the controller 28 causes the brake modulator to operate in accordance with the BTCS. Of course, it is contemplated that the cross axle loading BTCS algorithm can use a combination of wheel speed data and wheel stroke data in order to determine cross axle loading status, or the algorithm can rely solely on wheel stroke data. Further, the cross-axle loading BTCS algorithm does not necessarily rely on data from the accelerator pedal sensor 36. If the vehicle 10 enters the cross-axle loading state while stopped, the cross-axle loading BTCS algorithm can cause the brake modulator 18 to apply a braking torque before the driver depresses the accelerator pedal 36. Thus, the differential gear assemblies 48, 56 can transfer the drive torque to the first diagonal wheels with little or no spinning of the second diagonal wheels. That is, the cross-axle loading BTCS algorithm can be proactive because it can be activated before the driver of the vehicle 10 depresses the accelerator pedal 36. This advantage can reduce the lag time between when the first wheel starts to slip and when the controller 28 causes the brake modulator to operate in accordance with the BTCS.

Figure 5:
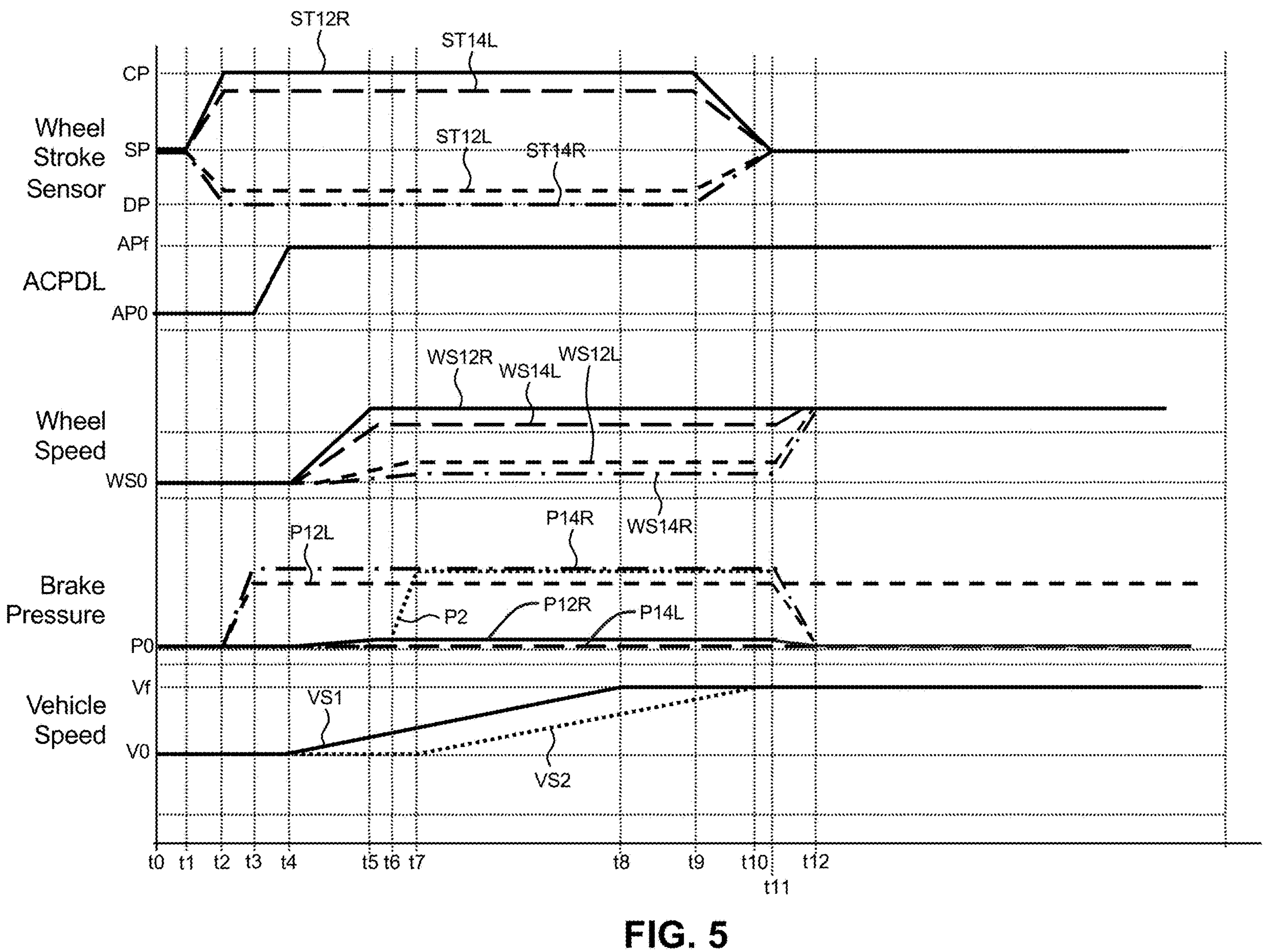
FIG. 5 is a timing diagram of signals for an exemplary operation of the brake traction control system of the vehicle of FIG. 1.

FIG. 5 shows an exemplary operation of the cross-axle loading BTCS algorithm of FIG. 4 as the vehicle 10 traverses the depression D in the orientation depicted in FIG. 1. Operation of the vehicle 10 can begin at time to. The data from the suspension stroke sensors 24 indicates that each of the wheels 12L, 12R, 14L, 14R are in the static position SP, the accelerator pedal 26 is in an initial position APO, the wheel speed of each of the wheels 12L, 12R, 14L, 14R is the same initial value WSO, the brake pressure supplied to each of the brakes 20 is the same initial pressure PO, and the vehicle 10 is stopped or traveling at an initial speed VO.

If the vehicle 10 is stopped at initial time to, then the initial position APO of the accelerator pedal 26 can correspond to a release position where the driver does not engage the accelerator pedal 26. The initial brake pressure PO can have a value of zero or a value that maintains the vehicle 10 stationary. The value of initial wheel speed WSO and the initial vehicle speed VO can be zero.

At time t1, the vehicle 10 can move from a position where the right front wheel 12R has already traversed the depression D, the left front wheel 12L and the right rear wheel 14R are entering the depression D, and the left rear wheel 14L has not yet reached the depression D.

At time t2, the left front wheel 12L and the right rear wheel 14R can be located over or in the depression such that at least one of the left front wheel 12L and the right rear wheel 14R is spaced above the depression D and disengaged from the travel surface S. The stroke signal ST12R output by the suspension stroke sensor 24 for right front wheel 12R indicates that the right front wheel 12R has transitioned from the static position SP to the compressed position CP. The stroke signal ST14L output by the suspension stroke sensor 24 for left rear wheel 14L indicates that the left rear wheel 14L has transitioned from the static position SP to a position that is between the static position and the compressed position CP. The stroke signal ST12L output by the suspension stroke sensor 24 for left front wheel 12L indicates that the left front wheel 12L has transitioned from the static position SP to a position that is between the static position SP and the droop position DP. The stroke signal ST14R output by the suspension stroke sensor 24 for right rear wheel 14R indicates that the right rear wheel 14R has transitioned from the static position SP to the droop position DP. Thus, the left front wheel 12L and the right rear wheel 14R are unloaded wheels and the right front wheel 12R and the left rear wheel 14L are loaded wheels. Further, the right front wheel 12R and the left rear wheel 14L can be described as first diagonal wheels and the left front wheel 12L and the right rear wheel 14R can be described as second diagonal wheels.

Since at least one of the left front wheel 14L and the right rear wheel 14R is an unloaded wheel and the right front wheel 12R and the left wheel 14L are loaded, the controller 28 can determine that the conditions of step S104 are met, and the controller 28 can cause the brake modulator 18 to supply a braking pressure to the brakes 20 coupled to the left front wheel 12L and the right rear wheel 14R. Thus, the pressure signal P12L for the brake 20 coupled to the left front wheel 12L and the pressure signal P14R for the brake 20 coupled to the left front wheel 12L can show an increase from an initial pressure PO to a respective predetermined braking pressure.

The respective predetermined braking pressure can be reached at or before time t3 from the initial position APO toward a final position APf. In either scenario, the braking pressure applied to the brakes 20 of the second diagonal wheels 12L, 14R can be sufficient to overcome the drive torque applied to the second diagonal wheels 12L, 14R At time t3, the driver of the vehicle 10 can move the accelerator pedal 26 from the initial position APO toward a final position APf and reaches the final position APf at time t4.

At time t4, the power source 42 can output a drive torque that is sufficient to overcome the inertia of the vehicle 10. Further, the differentials 48, 56 divert drive torque away from the second diagonal wheels 12L, 14R, which lack traction with the travel surface S, and transfer the drive torque to the first diagonal wheels 12R, 14L, which have traction with the travel surface S. As a result, the wheel speed signals WS12R, WS14L for the first diagonal wheels 12R, 14L increase from the initial value WSO to a respective sustained value as shown inf FIG. 5. Meanwhile, the wheel speed signals WS12L, WS14R for the second diagonal wheels 12L, 14R can indicate a value of zero or a relative low wheel speed as compared to the wheel speed signals WS12R, WS14L for the first diagonal wheels 12R, 14L.

Since the first diagonal wheels 12R, 14L have traction with the travel surface S the vehicle speed signal VS1 can increase starting at time t4 from the initial value to a sustained speed at time t5, as shown in FIG. 5.

From time t5 to time t9, the second diagonal wheels 12L, 14R can traverse across the depression D, whether the wheels 12L, 14R are in or spaced above the depression D in the vertical direction V. At time t9, the second diagonal wheels 12L, 14R can begin to exit from the depression D or the space above the depression D.

At time t11, all four of the wheels 12L, 12R, 14L, 14R can be spaced away from the depression D and in contact with the travel surface S. The stroke sensor signals ST12R, ST12R, ST14L, ST14R indicate that all four wheels 12L, 12R, 14L, 14R are in the static position SP. In this state, the controller 28 can be configured determine that both of the conditions of step S104 are not met and the controller 28 can execute steps S110 and S112 in sequence. As a result, the brake modulator begins releasing the braking pressure from the brakes 20 of the second diagonal wheels 12L, 14R and the pressure signals P12L, P14R decrease to the initial pressure PO. Since all four wheels 12L, 12R, 14L, 14R can have equal traction with the travel surface S, the wheel speed signals WS12L, WS14R of the second diagonal wheels 12L, 14R increase and merge with the wheel speed signals WS12R, WS14L for the first diagonal wheels 12R, 14L at the same value and the vehicle 10 can continue along the travel surface at the final vehicle speed Vf.

In comparison to the algorithm illustrated in FIG. 4, FIG. 5 also includes a comparison pressure signal P2 and a comparison vehicle speed signal VS2 for a conventional BTCS system that does not include or rely on data from the suspension stroke sensors 24.

As discussed above, one or more limitations of the wheel speed sensors 22 can delay the detection by the controller 28 of wheel slip of any one or more of the wheels 12L, 12R, 14L, 14R. For example, the controller of the conventional BTCS might not detect wheel slip until time t6 and the fluid pressure at the brakes 20 does not reach the braking pressure until time t7. In contrast, the controller 28 executing the cross-axel loading BTCS algorithm of FIG. 4 can detect a potential traction loss much sooner at time t2 and the brake modulator 18 can increase the pressure at the brakes 20 to the braking pressure by time t3, which time occurs before the conventional BTCS has even detected a wheel slipping.

As a result, the comparison vehicle speed VS2 does not increase until time t7 and does not reach the final vehicle speed Vf until time t10, which times are well after times t4 and t8 at which the vehicle 10 begins accelerating and reaches the final vehicle speed Vf, respectively.

Accordingly, the BTCS 16 according to the disclosed subject matter can reduce the lag between actual wheel slippage and actuation of the brakes 20 of the diagonally opposed wheels. Further, the BTCS 16 can initiate traction control prior to actual wheel slippage. These advantages can improve the driver's perception of the performance of the vehicle 10.

Other features of the vehicle 10 are described with reference to FIG. 2.

It can be further advantageous to configure the vehicle 10 as an on-demand, all-wheel-drive vehicle 10. The power-take-off assembly 52 can include a clutch 60 that is in electrical communication with the controller 28. The clutch 60 can selectively connect and disconnect the input gear and the output of the power-take-off assembly 52 to engage or disengage the transfer of drive torque to the rear wheels 14L, 14R.

Each of the brakes 20 can include a brake pad and a rotating member that rotates with a respective one of the wheels 12L, 12R, 14L, 14R. The rotating member can be a drum or a disc. Each of the brakes 20 can include at least one piston that is actuated by fluid pressure in the respective one of the brake lines 40 to push the brake pad against the rotating member.

The transmission 46 can be an automatic transmission, a manual transmission, or a semi-automatic transmission. The transmission 46 can include an input shaft, an output shaft, and a speed ratio assembly. A coupling can connect the engine output shaft to the input shaft. The coupling can permit selective engagement/disengagement of the input shaft with the engine output shaft, or at least relative rotation of the engine output shaft with respect to the input shaft, in any manner that is conventional or developed in the future. Exemplary couplings can include, but are not limited to, a friction disc clutch and a torque converter.

The speed ratio assembly can connect the input shaft to the transmission output shaft such that the transmission output shaft can rotate at variable speeds relative to the input shaft. The speed ratio assembly can be a stepped speed ratio assembly or a continuously variable speed ratio assembly.

Alternatively, instead of using controller 28, the wheels speed sensors 22 can be in electrical communication with an additional controller (not illustrated) that is different from (or combined with) the controller 28. This additional controller can be utilized to affect a different control system of the vehicle 10, such as, but not limited to, an anti-lock brake system (not illustrated). This additional controller can be configured to receive processed data from the wheel speed sensors 22 or to receive the raw data from the wheel speed sensors 22 and process the raw data to indicate a rotational velocity of the respective wheels 12L, 12R, 14L, 14R.

Electrical communication lines (not numbered) can connect the controller 28 to the engine 44, the transmission 46, the brake modulator 18, the sensors 22, 24, 34, 36, and the clutch 60 in any appropriate manner. Electrical communication can be either one-way communication or two-way communication and can be networked or not networked. The controller 28 also can be referred to as an electronic control unit (ECU) or as a central processing unit. The controller 28 can be configured with hardware, with or without software, to perform the assigned task(s). The controller 28 can be configured as a smart sensor such that the sensors 22, 24, 34, 36 can process the raw data collected by the sensors 22, 24, 34, 36, or the sensors 22, 24, 34, 36 can be configured as a simple sensor that passes the raw data directly to the controller 28 without any manipulation of the raw data. The sensors 22, 24, 34, 36 can be configured to send data to the controller 28, with or without a prompt from the controller 28.

A gear shift lever (not shown) can be connected to the transmission 14, electrically, mechanically, or elector-mechanically, in any appropriate manner such that actuation of the gear shift lever by the operator can affect a shift from one gear ratio to another gear ratio within the transmission 46. The gear shift lever can be a mechanical lever or an electrical switch. The gear shift lever can be mounted in any one of a plurality of different locations within the vehicle 10, including but not limited to, on the center console, on the steering column, on the steering wheel, and on the instrument panel.

While certain embodiments of the invention are described above, it should be understood that the invention can be embodied and configured in many different ways without departing from the spirit and scope of the invention.

In one embodiment, instead of a modulator having fluid connection to calipers, direct electronic actuation of the brake can be performed (such as used in typical electronic parking brake type actuator device).

Instead of relying on the flag set in steps S106 and S112 and the comparison performed in step S110, alternate embodiments of the cross-axle loading BTCS algorithm can check at step S110 the output status of each port of the brake modulator to determine if braking pressure is being applied to diagonal wheels. If true, then the controller 28 can be configured to proceed to step S112 and release the braking pressure. If false, the controller 28 can be configured to proceed to step S108 and end the current iteration of the algorithm.

Instead of being configured as a front-wheel-drive with on-demand, rear-wheel-drive, alternate embodiments of the vehicle 10 can be primarily rear-wheel-drive with on-demand, front-wheel-drive.

Instead of the internal combustion engine 44 and the transmission 46, alternate embodiments of the power source 42 can include a first electric motor that drives the front differential gear assembly 48 and a second electric motor that drives the rear differential gear assembly 56. Alternatively, each wheel can be provided with an electric motor, and the diagonal braking feature can be in the form of electronic motor control at each wheel upon detection of cross axle load issues.

Instead of measuring the speed of the wheels, the sensors 22 can measure the rotational speed of the respective driveshafts 50L, 50R, 58L, 58R.

In alternate embodiments, the power plant output control device 38 can include a mechanical cable or linkage that connects the accelerator pedal 26 to the butterfly valve and moves the butterfly valve as the accelerator pedal 26 moves. If the vehicle 10 is configured as a hybrid or electric vehicle, the power plant output control device 38 can be an electric device such as, but not limited to, an inverter or an electromechanical actuator.

In alternate embodiments, the clutch 60 can be omitted and the vehicle 10 can be configured as an all-wheel drive vehicle.

What is claimed is:

1. A brake traction control system for a vehicle including a first wheel, a second wheel, a third wheel, a fourth wheel, and a power source configured to output a drive torque to at least a pair of the wheels, the brake traction control system comprising:

a plurality of brakes, each of the brakes is configured to be connected to a respective one of the wheels;

a brake modulator in communication with each of the brakes and configured to selectively actuate each of the brakes and selectively release each of the brakes; and a controller in electrical communication with the brake modulator and configured to:

determine a cross-axle loading condition is present if suspension stroke data for the first wheel indicates an unloaded state where the first wheel is spaced away from a travel surface, suspension stroke data for the second wheel and the third wheel indicate a loaded state where the second wheel and the third wheel are in contact with a travel surface, and the second wheel is diagonally opposed to the third wheel; and cause the modulator to actuate the brake connected to the first wheel and the brake connected to the fourth wheel if the controller determines the cross-axle loading condition.

2. The brake traction control system according to claim 1, wherein each of the wheels is movable through a suspension stroke that ranges from a compressed position to a droop position, the suspension stroke includes a static position that is between the compressed position and the droop position, and the controller is configured to:

determine the loaded state of a respective one of the wheels if the respective one of the wheels is spaced away from the static position in a direction toward the compressed position; and determine the unloaded state of the respective one of the wheels if the respective one of the wheels is spaced away from the static position in a direction toward the droop position.

3. The brake traction control system according to claim 1, further comprising:

an accelerator pedal configured to be in communication with the power source, the accelerator pedal is movable between an idle position that causes the powertrain to operate at at least one of an idle speed and idle torque output, and a maximum position that causes the power source to operate at at least one of a maximum speed and maximum torque output, wherein the controller is configured to cause the modulator to actuate the brake connected to the first wheel and the brake connected the fourth wheel if the controller determines the cross-axle loading condition and the accelerator pedal is in at least one of the idle position and the idle torque output.

4. The brake traction control system according to claim 3, wherein the controller is configured to cause the modulator to actuate the brake connected to the first wheel and the brake connected the fourth wheel if the controller determines the cross-axle loading condition and the accelerator pedal is spaced away from the idle position.

5. The brake traction control system according to claim 1, further comprising:

a differential gear assembly configured to be connected to each of the powertrain and a pair of the wheels, the differential gear assembly is configured to selectively transfer torque output by the powertrain to one or both wheels of the pair of wheels.

6. The brake traction control system according to claim 5, wherein the differential gear assembly is one of a speed biased differential gear assembly and a torque biased differential assembly.

7. The brake traction control system according to claim 1, wherein the brake modulator is in fluid communication with each of the brakes and configured to selectively apply fluid pressure to each of the brakes and selectively release fluid pressure from each of the brakes; and the controller is configured to cause the modulator to increase fluid pressure to the brake connected to the first wheel and the brake connected to the fourth wheel if the controller determines the cross-axle loading condition.

8. The brake traction control system according to claim 1, wherein the brake modulator is in communication with each of the brakes and configured to send an electronic brake signal to actuate and release each of the brakes; and the controller is configured to cause the modulator to actuate the brake connected to the first wheel and the brake connected to the fourth wheel if the controller determines the cross-axle loading condition.

9. The brake traction control system according to claim 1, wherein the controller is configured to cause the modulator to release or maintain the release of the brake connected to the second wheel and the brake connected to the third wheel if the controller determines the cross-axle loading condition.

10. The brake traction control system according to claim 1, wherein the controller is configured to cause the modulator to release the brake connected to the first wheel and the brake connected to the fourth wheel if the controller determines that cross-axle loading condition transitions from present to absent.

11. The brake traction control system according to claim 1, further comprising:

a brake pedal connected to the brake modulator and movable between a released position and a maximum braking position, wherein the brake modulator is configured to:

actuate each of the brakes if the brake pedal is spaced away from the released position and the controller determines that the cross-axle loading condition is absent; and release each of the brakes if the brake pedal moves into the released position and the controller determines that the cross-axle loading condition is absent, and the controller is configured to cause the brake modulator to actuate the brake connected to the first wheel and the brake connected the fourth wheel if the controller determines the cross-axle loading condition is present and the brake pedal is in the released position.

12. A vehicle comprising:

a first wheel, a second wheel, a third wheel, and a fourth wheel;

a power source connected to at least one of the wheels and configured to output a driving torque to the at least one of the wheels;

a plurality of brakes, each of the brakes is connected to a respective one of the wheels;

a brake modulator in communication with each of the brakes and configured to selectively actuate each of the brakes and selectively release each of the brakes; and a controller in electrical communication with the brake modulator and configured to:

determine a cross-axle loading condition is present if suspension stroke data for the first wheel indicates an unloaded state where the first wheel is spaced away from a travel surface, suspension stroke data for the second wheel and the third wheel indicate a loaded state where the second wheel and the third wheel are in contact with a travel surface, and the second wheel is diagonally opposed to the third wheel; and cause the modulator to actuate the brake connected to the first wheel and the brake connected to the fourth wheel if the controller determines the cross-axle loading condition.

13. The vehicle according to claim 12, further comprising:

a plurality of wheel stroke sensors, each wheel stroke sensor is configured to be coupled with a respective one of the wheels and output the suspension stroke data that is indicative of one of a plurality of wheel positions that include a static position, a compressed position, and a droop position, wherein the controller is configured to:

determine the loaded state of the respective one of the wheels if the suspension stroke data indicates that the respective one of the wheels is the compressed position; and determine the unloaded state of the respective one of the wheels if the suspension stroke data indicates that the respective one of the wheels is in the droop position.

14. The vehicle according to claim 12, further comprising:

a first differential gear assembly connected to the first wheel and the second wheel and selectively driving one or both of the first wheel and the second wheel.

15. The vehicle according to claim 14, further comprising:

a second differential gear assembly connected to the third wheel and the fourth wheel and selectively driving one or both of the third wheel and the fourth wheel.

16. The vehicle according to claim 12, further comprising:

an accelerator pedal in communication with the power source, the accelerator pedal is movable between an idle position and a maximum position, wherein the controller is configured to:

receive pedal position data that is indicative one of a plurality of pedal positions that includes the idle speed position, the maximum speed position, and at least one intermediate position that is between the idle position and the maximum position; and cause the modulator to actuate the brake connected to the first wheel and the brake connected the fourth wheel if the controller determines the cross-axle loading condition and the pedal position data indicates the idle position.

17. The vehicle according to claim 16, wherein the controller is configured to cause the modulator to actuate the brake connected to the first wheel and the brake connected the fourth wheel if the controller determines the cross-axle loading condition and the pedal position data is indicative of one of the intermediate position and the maximum speed position.

18. A brake traction control system for a vehicle including a first wheel, a second wheel, a third wheel, a fourth wheel, a power source configured to output a drive torque to at least a pair of the wheels, and an accelerator pedal in communication with the power source, the brake traction control system comprising:

a plurality of brakes, each of the brakes is configured to be connected to a respective one of the wheels;

a brake modulator in communication with each of the brakes and configured to selectively actuate each of the brakes and selectively release each of the brakes; and a controller in electrical communication with the brake modulator and configured to:

receive pedal position data that includes one of a plurality of positions of the accelerator pedal, the plurality of positions includes an idle position, a maximum position, and an intermediate position that is located between the idle position and the maximum position, the power source operates at an idle rating if the pedal position data indicates the idle position, the power source operates at a maximum rating if the pedal position data indicates the maximum position, and the power source operates at an intermediate rating that is less than the maximum rating and greater than the idle rating if the pedal position data indicates the intermediate position;

determine a cross-axle loading condition is present if suspension stroke data for the first wheel indicates an unloaded state where the first wheel is spaced away from a travel surface, suspension stroke data for the second wheel and the third wheel indicate a loaded state where the second wheel and the third wheel are in contact with a travel surface, and the second wheel is diagonally opposed to the third wheel; and cause the modulator to actuate the brake connected to the first wheel and the brake connected to the fourth wheel if the controller determines the cross-axle loading condition and the pedal position data indicates the idle position.

19. The brake traction control system according to claim 18, wherein the controller is configured to cause the modulator to actuate the brake connected to the first wheel and the brake connected to the fourth wheel if the controller determines the cross-axle loading condition and the pedal position data indicates one of the intermediate position and the maximum position.

20. The brake traction control system according to claim 18, wherein the controller is configured to cause the brake modulator to release the brake of the first wheel and the brake of the fourth wheel if the controller determines that the first wheel has transitioned from the unloaded state to a loaded state where the first wheel is in contact with the travel surface.

* * * * *